Oct. 4, 1932.  J. W. SHIELDS  1,880,504
VIBRATION INSULATOR
Filed Aug. 15, 1930  3 Sheets-Sheet 1

INVENTOR
JESSE W. SHIELDS.
BY
ATTORNEYS.

Oct. 4, 1932.    J. W. SHIELDS    1,880,504
VIBRATION INSULATOR
Filed Aug. 15, 1930    3 Sheets-Sheet 2
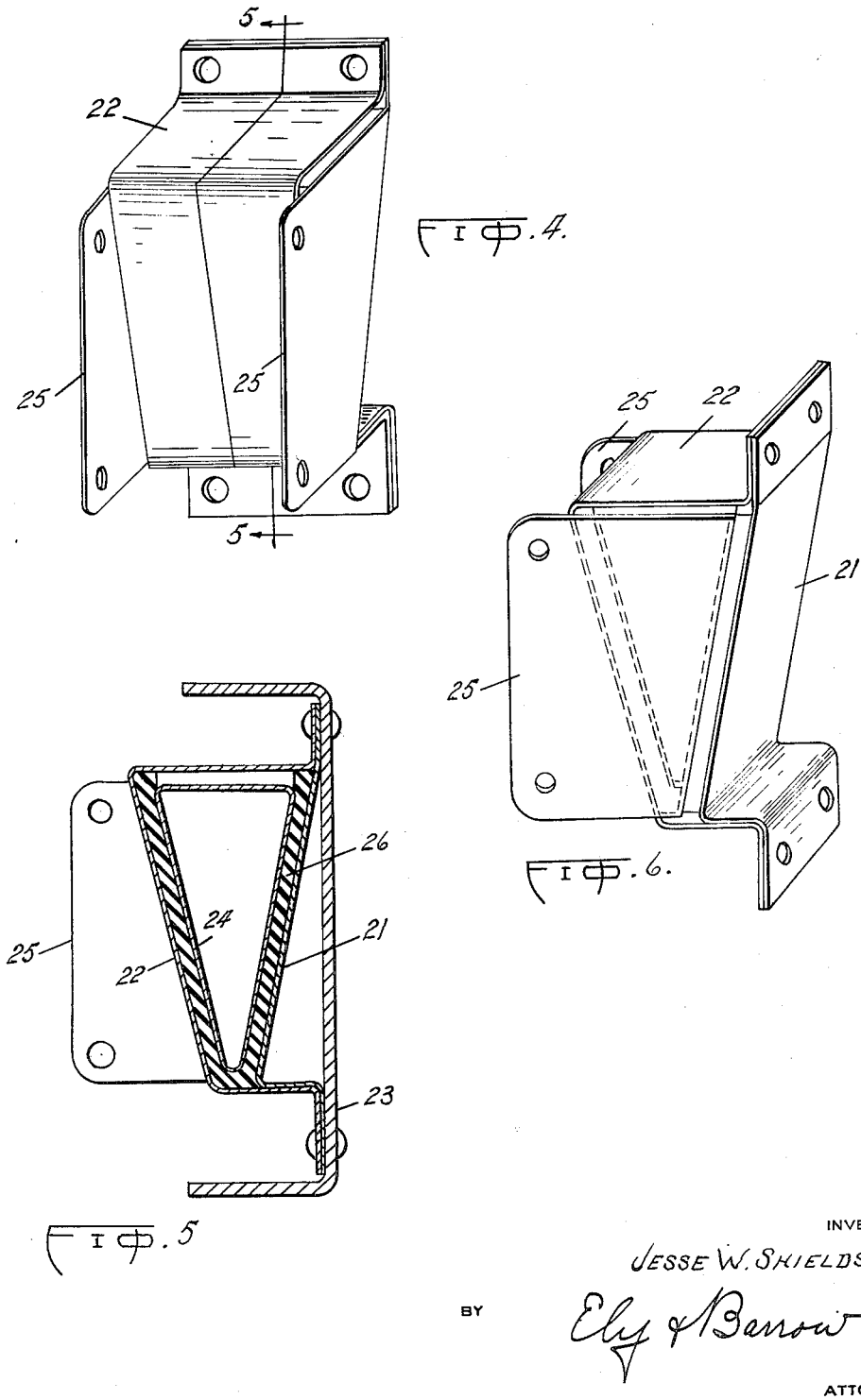
INVENTOR
JESSE W. SHIELDS.
BY
ATTORNEYS

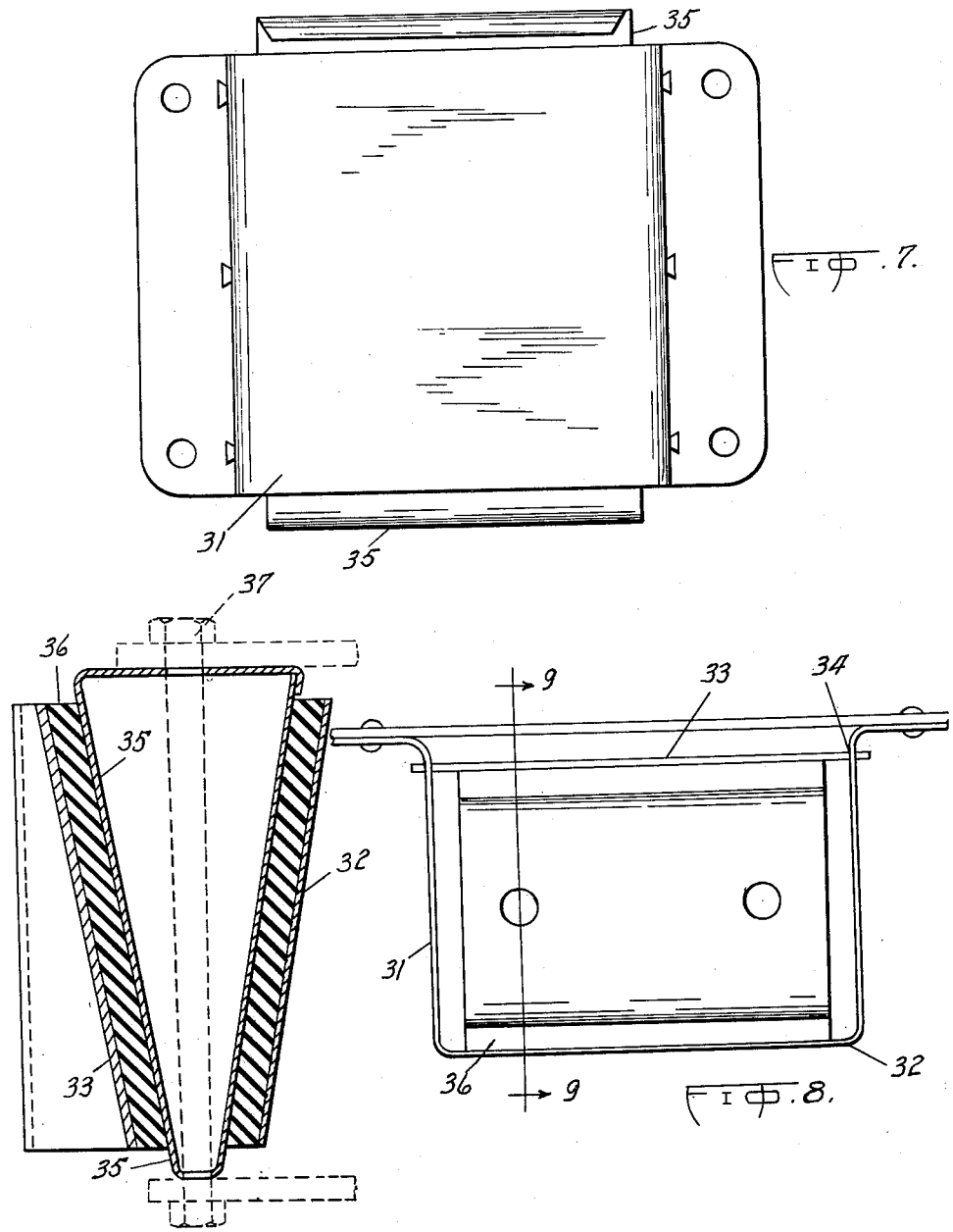

Patented Oct. 4, 1932

1,880,504

UNITED STATES PATENT OFFICE

JESSE W. SHIELDS, OF AKRON, OHIO, ASSIGNOR TO THE FIRESTONE TIRE & RUBBER COMPANY, OF AKRON, OHIO, A CORPORATION OF OHIO

VIBRATION INSULATOR

Application filed August 15, 1930. Serial No. 475,510.

This invention relates to vibration and shock insulators of a type particularly adapted for motor supports.

The general purpose of the invention is to provide an inexpensive, efficient insulator adapted for a plurality of uses.

It is a further object of the invention to provide an insulator which will not fail mechanically even if the rubber therein fails.

Again, it is an object of the invention to design an insulator in which the rubber is subjected to a combined compression and shear by a wedgelike action of the insulator members.

The above and other objects and purposes of the invention are achieved by the devices illustrated in the accompanying drawings and described below, it being understood that the invention is not limited to the exact structure and details shown and described.

In the drawings:

Figure 4 is a back perspective view of a modified form of the invention.

Figure 5 is a sectional view taken on line 5—5 of Figure 4.

Figure 6 is a side perspective view of the insulator shown in Figure 4.

Figure 7 is a rear elevation of a third form of the invention.

Figure 8 is a plan view of the insulator of Figure 7 secured to one of the members to be insulated.

Figure 9 is a vertical sectional view taken on line 9—9 of Figure 8.

Figures 1, 2, 3:
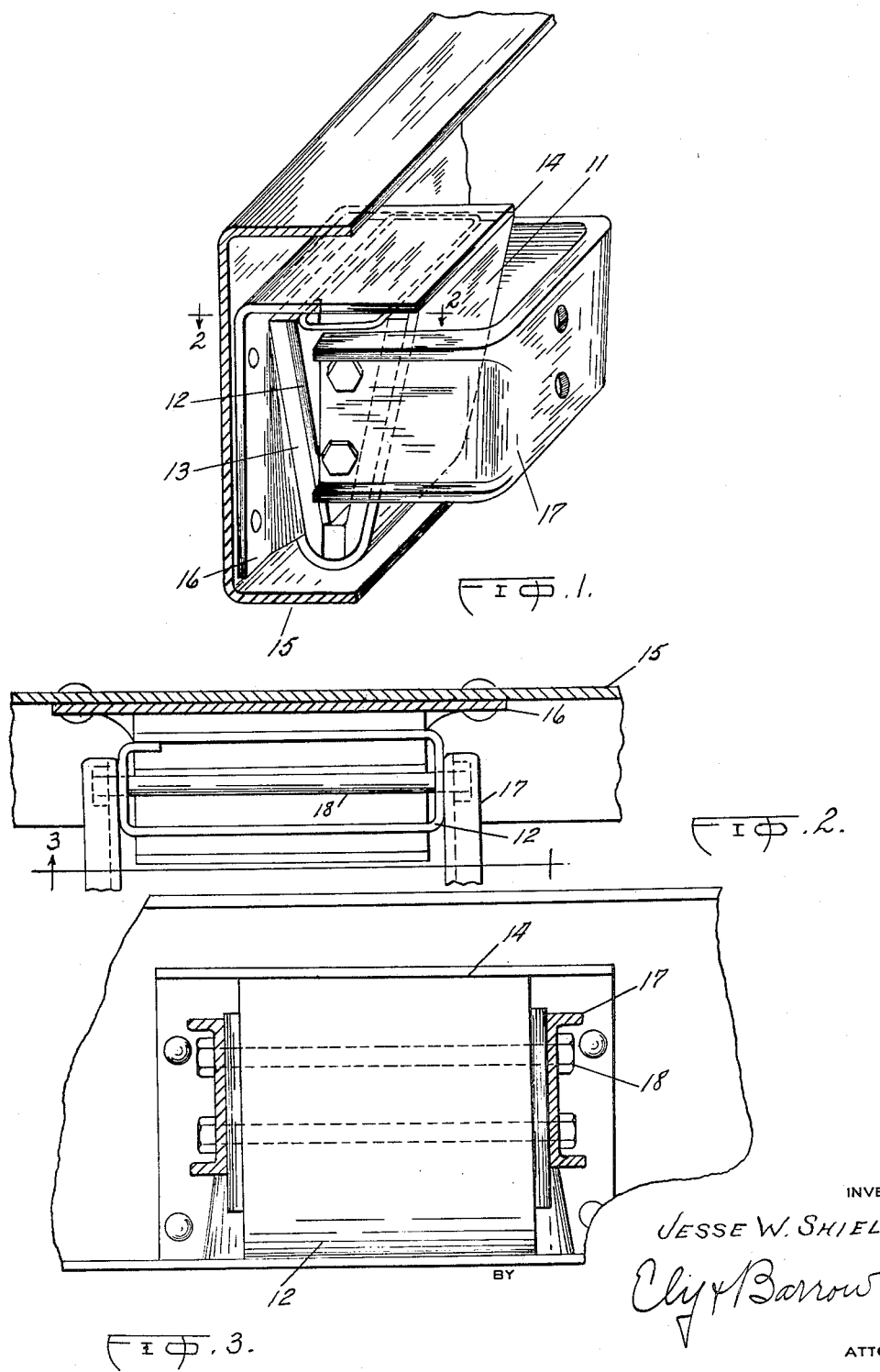
Figure 1 is a perspective view of an insulator embodying the invention.
Figure 2 is a plan view of the insulator taken on line 2—2 of Figure 1.
Figure 3 is a vertical sectional view taken on line 3—3 of Figure 2.

The form of the invention illustrated in Figures 1, 2 and 3 comprises a cradle member 11 and a wedge member 12 with a V-shaped rubber pad 13 vulcanized to and between the wedge and cradle members. The cradle member 11 is preferably extended and bent over the top of the insulator and is welded as at 14 to the other side of the cradle in order to strengthen the cradle. The cradle is secured to one of the members to be insulated, such as the channel iron 15 of an automobile frame, and for this purpose integral vertical side flanges 16 may be provided.

As seen in Figures 2 and 3 the ends of the wedge member protrude slightly beyond the ends of the cradle so that the wedge member can be clamped in a V-shaped bracket 17 by long bolts 18. The bracket 17 is secured to the other of the members to be insulated (not shown) such as the motor when the insulator is used as a motor support.

In the embodiment of the invention shown in Figures 4, 5 and 6, a cradle member is formed of a back plate 21 and a front plate 22, the ends of which are secured together and to a channel iron 23 or other support when used. The numeral 24 indicates a wedge member, the ends of which are extended and welded or otherwise fixed to end plates 25 which are suitably apertured for the reception of fastening means whereby the wedge element of the insulator can be secured to the other of the members to be insulated. A rubber pad 26 is vulcanized to and between the wedge and the cradle member.

Referring to Figures 7, 8 and 9 illustrating a third form of the invention, the numeral 31 indicates a cradle which is formed from a front plate 32 and a back plate 33. The back plate 33 is welded dovetailed or otherwise secured as at 34 to the sides of the front plate. A wedge member 35 cooperates with the cradle 31, a rubber pad 36 being vulcanized to and between said cradle and wedge members. As best illustrated in Figure 9 the wedge member is extended above and below the cradle member so that it may be secured to one of the members to be insulated by suitable means, such as indicated at 37 in dotted lines in Figure 9.

In all forms of the invention the load, such as an automobile motor or the like, which it is desired to insulate is secured to the wedge member of the insulator. It will be seen that the rubber in the various embodiments of the invention is subjected, in operation, to a combined shear and compression stress and that even if the load or shock would cause a failure of the rubber pad between the wedge and cradle members that a mechanical failure would not result.

While the insulator is particularly adapted for use as a motor support, various other uses will suggest themselves and are intended to be covered hereby.

As many other changes could be made in the form of the insulator, it is intended that all matter herein disclosed shall be interpreted as illustrative only and not in a limiting sense. Accordingly, various modifications and applications of the invention can be resorted to without departing from the spirit of the invention or the scope of the appended claims.

What is claimed is:

1. A vibration insulator comprising a wedge-shaped cradle, a wedge cooperating with said cradle, a rubber pad vulcanized to and between said wedge and cradle, means whereby the cradle may be secured to one member to be insulated, and means whereby the wedge may be secured to the other member to be insulated, the axis of the wedge extending substantially in the direction of the thrust to which the insulator is subjected.

2. A vibration insulator comprising a wedge-shaped cradle, a wedge cooperating with said cradle, and a rubber pad vulcanized to and between said wedge and cradle, the axis of wedge extending substantially in the direction of the thrust to which the insulator is subjected, the cooperating shapes of the wedge and cradle being such that in the relative movement of the wedge into the cradle, the rubber pad will be subjected to combined shear and compression stresses.

3. A vibration insulator comprising a cradle, a wedge fitting in said cradle, and a rubber pad vulcanized to and between said wedge and cradle, said cradle having sides V-shaped in section, one side extending over the top of the cradle and being fixed to the other side.

4. A vibration insulator comprising a cradle, a wedge fitting in said cradle, and a rubber pad vulcanized to and between said wedge and cradle, the ends of the wedge extending beyond the ends of the cradle and a bracket secured to said wedge.

5. A vibration and shock insulator comprising a wedge-shaped cradle, and a wedge and a rubber pad between said cradle and said wedge, said cradle being formed of two plates, one constituting the back, top and bottom, the other plate constituting the front of said cradle, the ends of the plates being secured together.

6. A shock insulator comprising a wedge-shaped cradle, and a wedge and a rubber pad vulcanized to and between said wedge and cradle, said cradle being formed from two plates, one comprising the ends and front of the cradle and the other comprising the back of the cradle, said wedge extending through the top and bottom of the cradle.

7. A shock insulator comprising a wedge-shaped cradle, a wedge and a rubber pad vulcanized to and between said wedge and cradle, said wedge extending through the top and bottom of the cradle, and means clamping on the top and bottom of the wedge for securing the wedge to one of the members to be insulated.

JESSE W. SHIELDS.